(12) United States Patent
Bellert

(10) Patent No.: US 9,621,765 B2
(45) Date of Patent: Apr. 11, 2017

(54) METHOD FOR SUPPORTING COLOR CONVERSION ON PREMULTIPLIED DATA

(71) Applicant: Konica Minolta Laboratory U.S.A., Inc., San Mateo, CA (US)

(72) Inventor: Darrell Eugene Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 14/792,274

(22) Filed: Jul. 6, 2015

(65) Prior Publication Data

US 2017/0013173 A1    Jan. 12, 2017

(51) Int. Cl.
G06F 15/00    (2006.01)
H04N 1/60    (2006.01)

(52) U.S. Cl.
CPC ................................. H04N 1/6025 (2013.01)

(58) Field of Classification Search
None
See application file for complete search history.

(56) References Cited

U.S. PATENT DOCUMENTS

2007/0053424 A1*    3/2007    Uro .......................... H04N 9/67
                                                                 375/240
2015/0054843 A1    2/2015    McDonald et al.

FOREIGN PATENT DOCUMENTS

WO        2008/101210 A2      8/2008

OTHER PUBLICATIONS

Extended European Search Report issued in corresponding European Application No. 16172940.5 dated Nov. 23, 2016 (8 pages).

* cited by examiner

*Primary Examiner* — Helen Q Zong
(74) *Attorney, Agent, or Firm* — Osha Liang LLP

(57) ABSTRACT

A method for converting color data includes reading from a memory the color data represented in a first color space; converting the color data into un-premultiplied color data; converting the un-premultiplied color data from the first color space to a second color space; converting the un-premultiplied color data in the second color space into first premultiplied color data; and writing the first premultiplied color data to the memory.

20 Claims, 6 Drawing Sheets

```
c = orig_color_pixel;
a = alpha_pixel;
color_new = a ? (c * 255) / a : 0;
```

FIG. 5

```
c = converted_color_pixel;
a = alpha_pixel;
color_new = (c * a) / 255;
```

FIG. 6

METHOD FOR SUPPORTING COLOR CONVERSION ON PREMULTIPLIED DATA

BACKGROUND

A color space conversion is often required for handling color data of an electronic document or an image over different computing systems such as a personal computer (PC) or a printer system. In general, a suitable color space is selected depending on the computing system. For example, an RGB color space is generally used for a PC to display electronic documents and images on a monitor, and a CMYK color space is used for a printer system to output print data on paper. Thus, the printer system must convert the print data from RGB to CMYK before printing.

Some color data may need additional conversions before and after the color space conversion. Such color data may contain color values (e.g., red, green, and blue in the RGB color space) as well as an alpha-channel value (e.g., 0-100%), which is normally used as an opacity channel. To represent the degree of transparency, each color value is multiplied by the alpha-channel value. In general, two kinds of representations are known for representing the same color with opacity—straight and premultiplied.

In the straight representation, the color values (i.e., red, green, and blue) are not multiplied by the alpha-channel. On the other hand, in the premultiplied representation, the color values are premultiplied by the alpha value. For example, if an electronic document specifies a red pixel in the RGB color space (RGB=255, 0, 0) that is 50% transparent (alpha=127), the premultiplied color data will actually be RGBa=(127, 0, 0, 127).

However, a conventional color management module is focused strictly on converting colors from one color space to another. Thus, feeding premultiplied color into the color management module may result in incorrect output. Continuing with the example above, color converting a half transparent premultiplied red pixel will require inputting RGB=(127, 0, 0) into the color management module. Although the intended color is pure red, the color data that will come out of color conversion is actually a dark red color in the new color space. Accordingly, any premultiplied input data that needs to be color converted must first be "un-premultiplied." Furthermore, the converted color data needs to be "re-premultiplied" for applications that expect the color data to be premultiplied.

Conventionally, the following steps have been performed to execute color conversion for premultiplied color data from RGBa (RGB+alpha channel) to CMYKa (CMYK+alpha channel):

Step 1: Un-premultiply all color pixels (RGBa) to restore the color data to a representation expected by the conventional color conversion module.

Step 2: Send all color pixels to the conventional color conversion module to convert the colors from RGBa to CMYKa.

Step 3: Re-premultiply all color pixels to restore the color data to a premultiplied state (CMYKa) if additional processing on the data expects a premultiplied state.

Although there is not a significant CPU cost to the "un-premultiplication" step (Step 1) and "re-premultiplication" step (Step 3), there is a significant memory cost. First the computing system must "un-premultiply" an entire scanline of four channels (RGBa) into a separate buffer of three channels (RGB). This requires accessing a memory to read and write each pixel in the scanline once. Then, the Color Management Module converts an entire scanline of 3 channels (RGB) into a separate buffer of 4 channels (CMYK), again accessing the memory to read and write each pixel once. Then, a third pass may be needed to "re-premultiply" an entire scanline of 4 channels (CMYK) into a separate buffer of 5 channels (CMYKa), requiring a third memory access to read and write each pixel.

Although the calculation is not expensive, the three-step conversions require excessive memory access and negatively affect performance of a system executing color conversion.

SUMMARY

In general, the invention relates to a method for converting color data from one color space to another color space.

In one aspect according to one or more embodiments, a method for converting color data comprises: reading from a memory the color data represented in a first color space; converting the color data into un-premultiplied color data; converting the un-premultiplied color data from the first color space to a second color space; converting the un-premultiplied color data in the second color space into first premultiplied color data; and writing the first premultiplied color data to the memory.

In another aspect according to one or more embodiments, a color conversion system comprises: a memory that stores color data represented in a first color space; and a processor that reads from the memory the color data, converts the color data into un-premultiplied color data, converts the un-premultiplied color data from the first color space to a second color space, converts the un-premultiplied color data in the second color space into first premultiplied color data, and writes the first premultiplied color data to the memory.

Other aspects of the invention will be apparent from the following description and the appended claims.

BRIEF DESCRIPTION OF DRAWINGS

FIGS. 5 and 6 each show example code for un-premultiplying or premultiplying color data in accordance with one or more embodiments of the invention.

DETAILED DESCRIPTION

Figure 1:
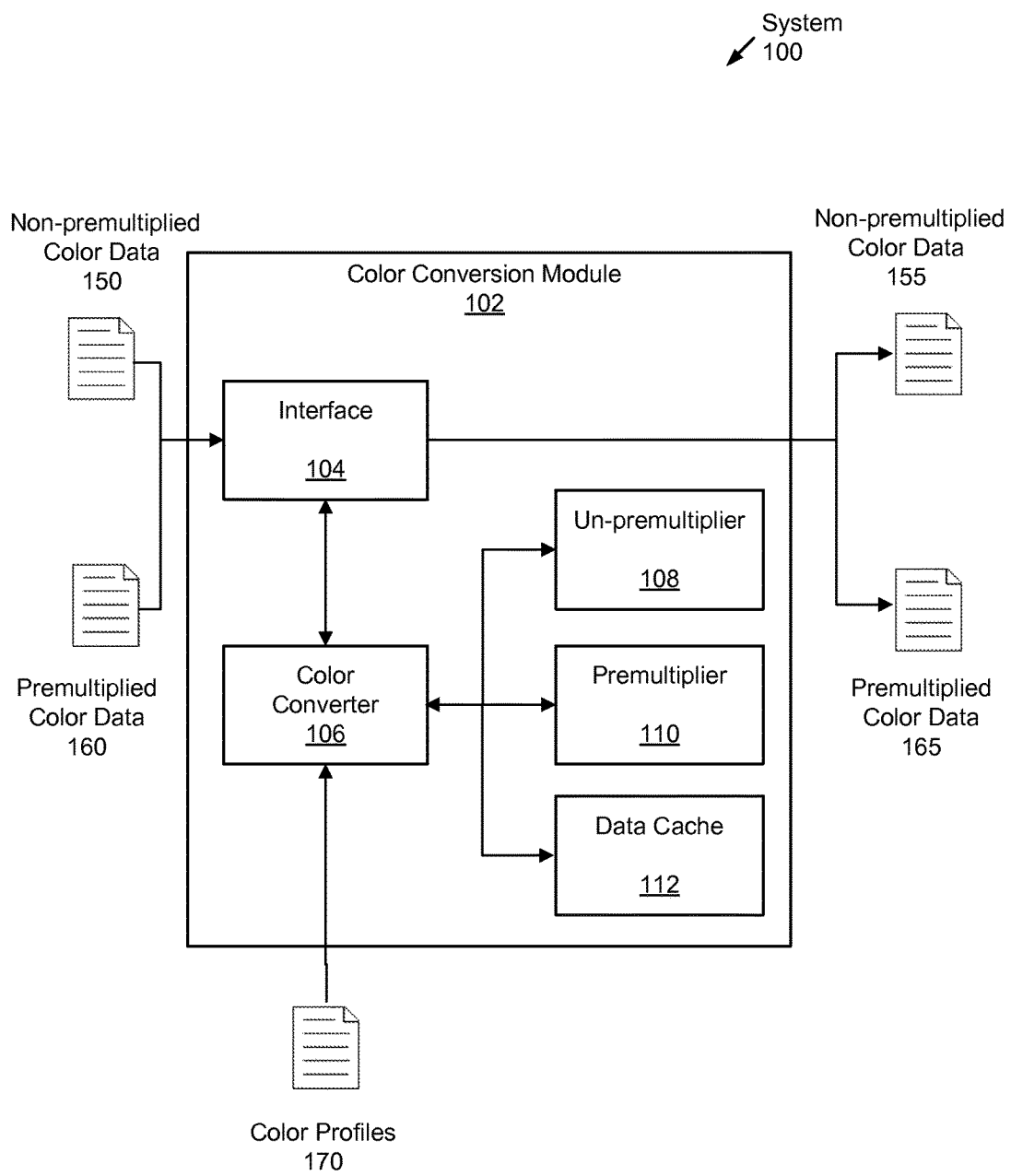
FIG. 1 shows a block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a system, and a non-transitory computer readable medium (CRM) for converting color data from one color space (e.g., RGB, GRAY, CMY, HSL, etc.) to another color space. Examples of the system include, but are not limited to, a printing system, a digital video system, a graphics editing system, and other computing systems that handle color data such as a PC, a tablet, or a smartphone. For purposes of illustration only, a printing system is mainly used in the description of embodiments that follows.

When printing an electronic document represented in a Page Description Language (PDL) in response to a request from a client PC, a printing system implements a color conversion module for supporting color conversion from one color space to another. The color conversion module may be implemented by hardware, software, or combination thereof. For example, a PDL may describe the color data for a page in the RGB color space, but before the printing system prints, the color data must be converted to the CMYK color space generally used for a physical printer.

As stated above, conventionally, the aforementioned three steps (Steps 1-3) have been required to convert a scan line of premultiplied color pixels from RGBa to CMYKa.

To improve performance, one or more embodiments of the invention handle premultiplied color channels directly in the color conversion module. Since executing the actual conversion of colors from one color space to another requires the color conversion module to access every single pixel (step 2 above), it then becomes trivial to add "un-premultiplication" and "re-premultiplication" as part of the color conversion process. Instead of the aforementioned three-step process, one or more embodiments of the invention perform the following two-step process.

New Step 1: Inform the color conversion module that the input data is premultiplied and whether or not the output should be premultiplied.

New Step 2: Send all color pixels AND alpha pixels to the color conversion module to convert the colors from RGBa to CMYKa. As part of the conversion, it will first "un-premultiply" the pixel, convert the pixel to a new color space, and then "re-premultiply" the pixel if needed. For each conversion process, intermediate color data may be temporarily stored in a cache memory such as a CPU register.

In this two-step process according to one or more embodiments, another system or application that calls the color conversion module is no longer required to do a pre-pass to first "un-premultiply" premultiplied color and a post-pass to "re-premultiply" converted color, thus saving these two memory accesses. As a result, embodiments of the invention provide improved performance for color conversion, and the degree of improvement becomes more significant as the amount of data becomes larger. Apart from the color conversion module, a method according to one or more embodiments of the invention, which employs the abovementioned new two-step process, allows a user to continue working with the premultiplied color format after color conversion.

Additional details of embodiments of the invention will now be described with reference to the figures. FIG. 1 shows a system (100) in accordance with one or more embodiments of the invention. As shown in FIG. 1, the system (100) includes a color conversion module (102), and the color conversion module (102) includes an interface (104), a color converter (106), an un-premultiplier (108), a premultiplier (110), and a data cache (112).

The color conversion module (102) may load both non-premultiplied color data (150) or premultiplied color data (160) provided from another system or application, and convert the color data from one color space to another color space. The color conversion module (102) may output non-premultiplied (i.e., straight) color data (155) or premultiplied color data (165) that is color-converted. The non-premultiplied color data (150, 155) and premultiplied color data (160, 165) may include, but are not limited to, document data, image data, video data, etc.

The color conversion module (102) may load one or more color profiles (170) required for the color space conversion. Each color profile is a table matching color values from one color space to another. Details of the color profiles are well-known in the art and are therefore omitted. The color profiles may be stored in an internal memory or a storage of the system (100).

Each of these components (104)-(112) may be located on the same computing device (e.g., a printer, a desktop computer, a server computer, a laptop computer, a tablet, a smart phone, a wearable device, etc.) or may be located on different computing devices connected by a network having wired and/or wireless segments. Further, one or more of these components (104)-(112) may be executed by one or more processors, graphics processors, or other dedicated hardware optimized for color conversion. Although not shown in the drawings, a storage may be prepared in the system (100) to store any data that has been processed and/or will be processed by one of the other aforementioned components.

In one or more embodiments of the invention, the interface (104) may read from a memory (e.g., RAM or main memory) or a storage device (e.g., Hard Disk Drive (HDD) or Solid-state Drive (SSD)) non-premultiplied color data (150) or premultiplied color data (160) represented in one color space such as RGB. In one or more embodiments of the invention, the interface (104) may receive from another system or an application the non-premultiplied color data (150) or the premultiplied color data (160). For example, the interface (104) may be hardware- or software-programmed for receiving the color data from another system or application.

The read or received input color data (150, 160) may be stored on a data cache (112). The data cache (112) may be implemented by a CPU data cache, which is a faster memory than the main memory. The data cache (112) may temporarily store the input color data (150, 160) as well as the output color data (155, 165). Intermediate color data (i.e., un-premultiplied color data, color converted color data before re-premultiplication) may be stored in CPU registers. In one or more embodiments of the invention, when the color conversion module (102) is implemented as a dedicated hardware module or chip, the data cache (112) may be implemented by a dedicated cache memory.

Furthermore, the interface (104) may read or receive additional information along with the color data. For example, the interface (104) may read or receive a flag representing whether the input color data is premultiplied (e.g., 0 or false indicates non-premultiplied data, and 1 or true indicates premultiplied data) and a separate flag indicating whether the output color data is to be premultiplied (e.g., 0 or false indicates non-premultiplied data, and 1 or true indicates premultiplied data). Other information may be provided additionally or alternatively, such as format information representing input document format (e.g., XPS, OOXML, etc.) and conversion information representing color spaces of input and output color data. By receiving such additional information, the color conversion module may be informed whether the input data is premultiplied and whether the output data is to be premultiplied. According to one or more embodiments, this step corresponds to the aforementioned New Step 1.

In one or more embodiments of the invention, the color converter (106) may convert the color data read or received via the interface (104) from the original color space to another color space using the color profiles (170). Before converting the color data, the color converter (106) determines if the color data is premultiplied or not. For example, the color converter (106) may read the flag indicating that the color data is premultiplied. The color converter (106) may employ any methods for such determination. Alternatively, the color converter (106) may know a format of the input document data based on the aforementioned format information, and determine the format requires the color data to be premultiplied. For example, the color converter (106) may determine that the color data is premultiplied when the document format is XPS or OOXML.

When the color converter (106) determines that the input data is premultiplied, the color converter (106) instructs the un-premultiplier (108) to un-premultiply the color data, and performs the color conversion using the color profiles (170). After the conversion, when the color converter (106) determines that the output data is to be premultiplied, the color converter (106) instructs the premultiplier (110) to premultiply the converted color data, and outputs the premultiplied color data (165) via the interface (104). According to one or more embodiments, these steps correspond to the aforementioned New Step 2.

On the other hand, when the color converter (106) determines that the input data is not premultiplied, the color converter (106) may convert the color data without un-premultiplication and when the color converter (106) determines that the output data is not to be premultiplied, the color converter (106) may output the converted color data without re-premultiplication.

In one or more embodiments of the invention, the color converter (106) may refer to another flag indicating whether the output color data is to be premultiplied, inputted to the interface (104) as the additional information. Even when the color converter (106) determines that the input color data is premultiplied, the color converter (106) may output the converted color data without re-premultiplication based on the other flag. In this case, the color converter (106) may output the original alpha-channel value along with the converted un-premultiplied color data.

In one or more embodiments of the invention, the un-premultiplier (108) may convert the input color data into un-premultiplied color data (i.e., un-premultiplication). The un-premultiplier (108) may execute any method for the un-premultiplication.

For example, the un-premultiplier (108) may execute the un-premultiplication according to an algorithm as shown in FIG. 5. In this algorithm, "orig_color_pixel" indicates each premultiplied color component (e.g., red, green, or blue component in the RGB color space), and "alpha_pixel" indicates an alpha-channel component. In this example, the maximum value for representing each component is 255. Each component of the un-premultiplied color data "color_new" may be calculated by the following equation when alpha_pixel is not zero:

color_new=(orig_color_pixel*255)/alpha_pixel and the following equation when alpha_pixel is zero:

color_new=0

In one or more embodiments of the invention, the premultiplier (110) may convert the un-premultiplied color-converted data into premultiplied color data (i.e., re-premultiplication). The premultiplier (110) may execute any method for the premultiplication. For example, the premultiplier (110) may execute the premultiplication according to an algorithm as shown in FIG. 6. In this algorithm, "converted_color_pixel" indicates each converted color component (e.g., cyan, magenta, yellow, or black component in the CMYK color space), and "alpha_pixel" indicates the original alpha-channel component. Each component of the re-premultiplied color data "color_new" may be calculated by the following equation.

color_new=(converted_color_pixel*alpha_pixel)/255

While FIG. 1 shows one particular configuration of components for illustration purposes, other configurations may be used without departing from the scope of the invention. For example, various components may be combined to form a single component. As another example, the functionality performed by a single component may be performed by two or more components.

Figure 2:
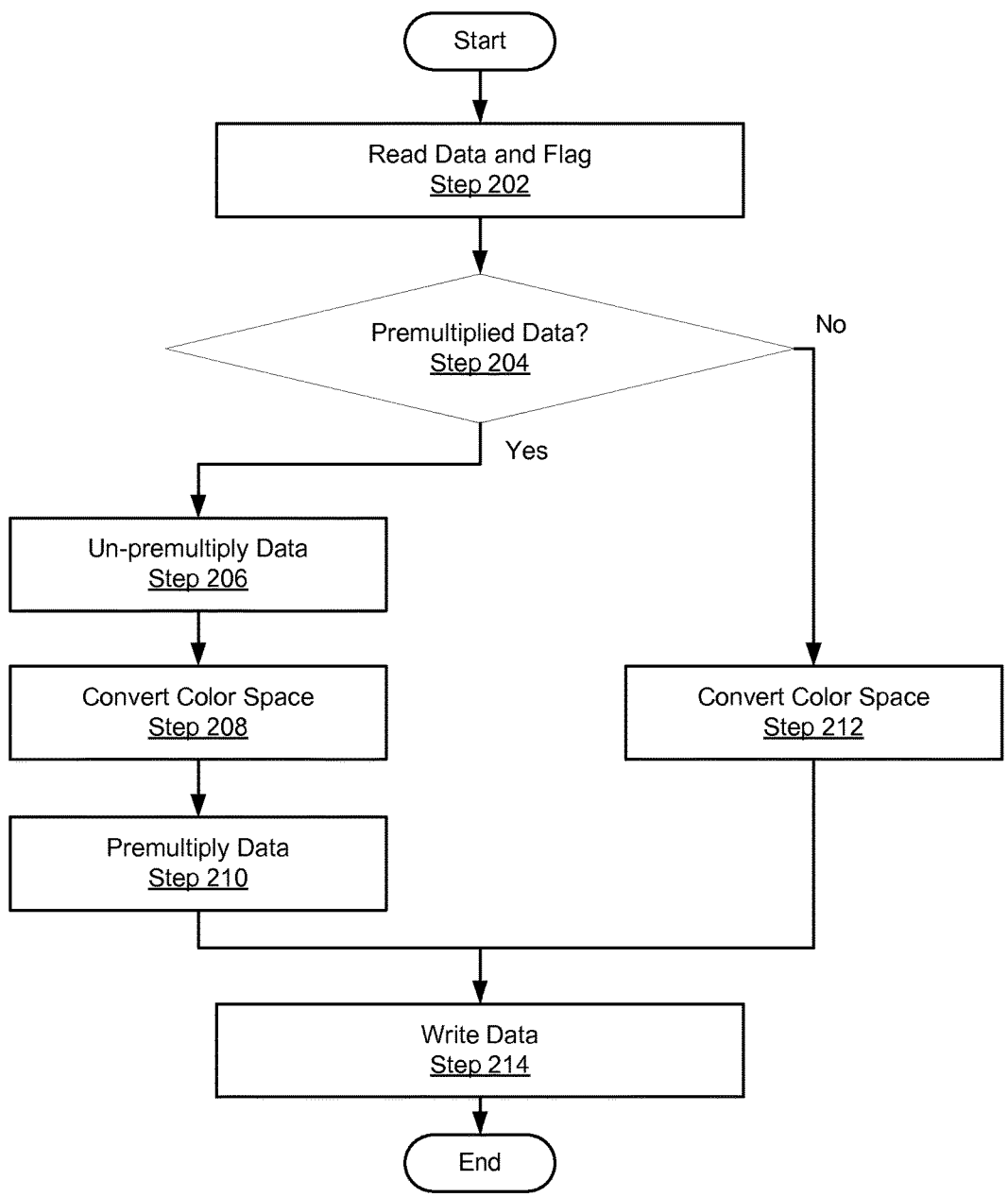
FIGS. 2-4 each show a flowchart in accordance with one or more embodiments of the invention.

FIG. 2 shows a flowchart in accordance with one or more embodiments of the invention. The process depicted in FIG. 2 may be used to convert color data from one color space to another color space with un-premultiplication and re-premultiplication as needed. One or more of the steps in FIG. 2 may be performed by the components of the system (100), discussed above with reference to FIG. 1. In one or more embodiments of the invention, one or more of the steps shown in FIG. 2 may be omitted, repeated, and/or performed in a different order than the order shown in FIG. 2. Accordingly, the scope of the invention is not limited to the specific arrangement of steps shown in FIG. 2.

Initially, the interface (104) may read from a memory input color data represented in a color space, and a flag, as additional information (Step 202). The input color data read from the memory may be stored in the data cache (112). Next, the color converter (106) may determine whether the input color data is premultiplied based on the flag (Step 204). For example, if the flag indicates that the input color data is premultiplied, the color converter (106) determines that the input color data is premultiplied. Further, if the flag does not indicate that the input color data is premultiplied, the color converter (106) determines that the data is not premultiplied.

If the color converter (106) determines that the input color data is not premultiplied, the following conversion process is performed. That is, if the color converter (106) determines that the input color data is not premultiplied (No at Step 204), the color converter (106) may convert the input color data from the color space (e.g., RGB) to another color space (e.g., CMYK) (Step 212), and write the converted color data to the memory (Step 214).

If the color converter (106) determines that the input color data is premultiplied, the following conversion process is performed. That is, if the color converter (106) determines that the input color data is premultiplied (Yes at Step 204), the color converter (106) may instruct the un-premultiplier (108) to convert the premultiplied input color data to un-premultiplied color data (Step 206). The un-premultiplier (108) may execute the un-premultiplication process according to the algorithm as shown in FIG. 5, for example. After the un-premultiplication, the color converter (106) may convert the un-premultiplied input color data from the color space (e.g., RGB) to another color space (e.g., CMYK) (Step 208). Next, the color converter (106) may instruct the premultiplier (110) to convert the color-converted color data to premultiplied color data (Step 210). The premultiplier (110) may execute the premultiplication process according to the algorithm as shown in FIG. 6, for example. After the premultiplication, the interface (104) may write the premultiplied color data to the memory (Step 214).

In one or more embodiments of the invention, the color conversion module (102) may skip Step 210 and may output the un-premultiplied color data in the second color space to the memory without re-premultiplication.

In one or more embodiments of the invention, the interface may receive the input color data and the flag from another system or application. Furthermore, the interface may output the color data (premultiplied or un-premultiplied) to the other system or the application after the color conversion.

In one or more embodiments of the invention, the color conversion module (102) may be a program executed by a central processing unit (CPU), a graphics processing unit (GPU), or other dedicated hardware in the system (100), and the interface (104) is a program interface for communicating with other programs installed in the system (100). In addition, the system (100) may be connected to a network, and the color conversion module (102) may receive the color data and the flag from another system or application on the network. The system (100) may output the converted color data to the other system via the network.

In one or more embodiments of the invention, the interface (104) may receive additional information along with the color data. For example, the interface (104) may receive conversion information representing color spaces of input and output color data, and/or another flag representing whether the output data should be premultiplied. The color converter (106) may read the color profiles required for color conversion between the specified input and output color spaces, and execute the color-space conversion. Furthermore, the color converter (106) may premultiply the color-converted input data before output even when the input color data is not premultiplied, and vice versa.

Figure 3:
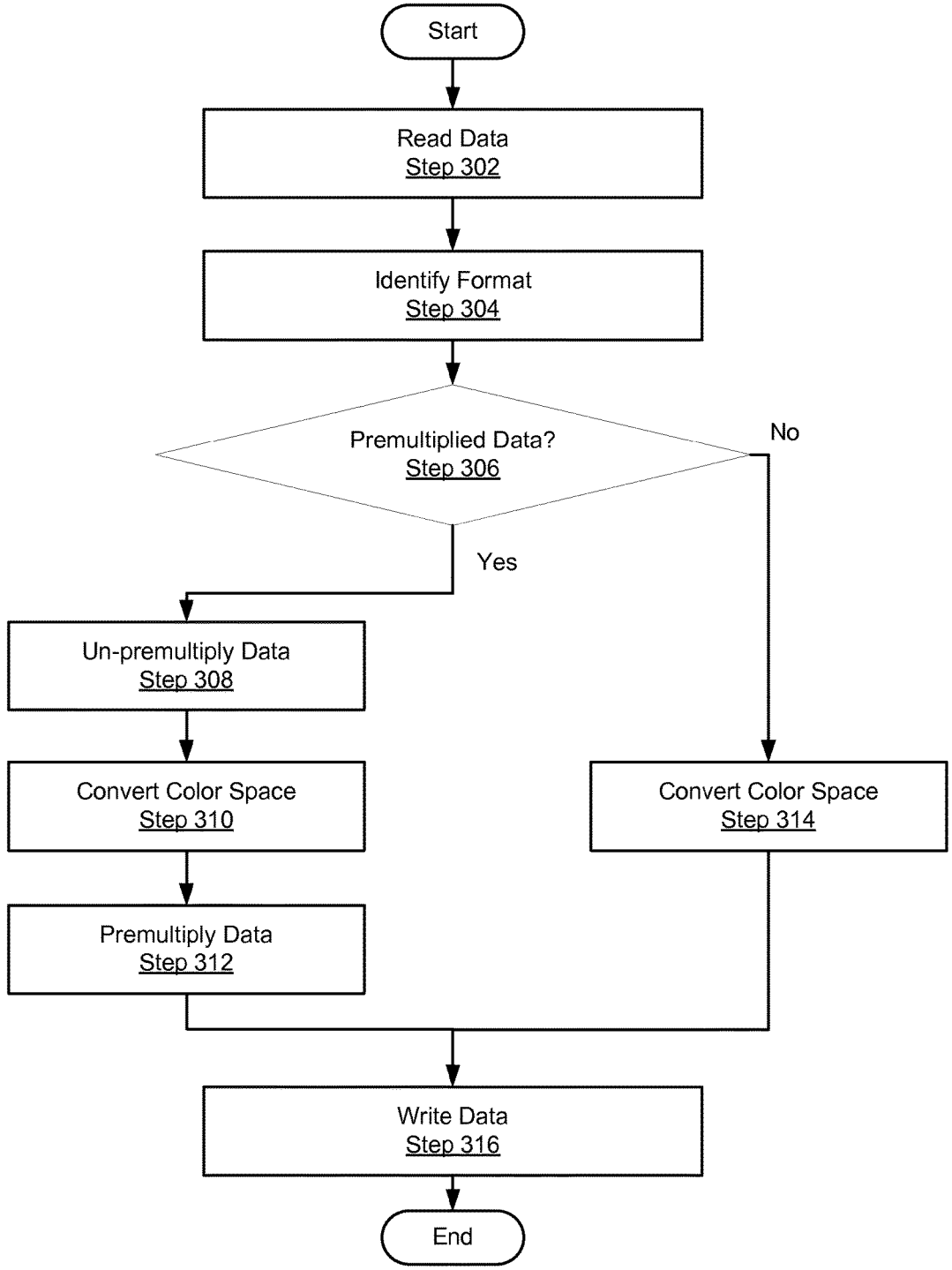

FIG. 3 shows a flowchart in accordance with one or more embodiments of the invention. The process depicted in FIG. 3 may be used to convert color data of a document having a specific format from one color space to another color space with un-premultiplication and re-premultiplication as needed. One or more of the steps in FIG. 3 may be performed by the components of the system (100), discussed above with reference to FIG. 1. In one or more embodiments of the invention, one or more of the steps shown in FIG. 3 may be omitted, repeated, and/or performed in a different order than the order shown in FIG. 3. Accordingly, the scope of the invention is not limited to the specific arrangement of steps shown in FIG. 3.

In accordance with one or more embodiments of the process depicted in FIG. 3, the interface (104) may read from the memory document data having a specific format such as PCL, XL, PostScript, PPML, PDF, XPS or OOXML (Step 302). Next, a parsing module (not shown) may parse the document data and identify its format (Step 304) for the color converter (106). For example, the parsing module may identify the format by searching for a tag indicating the format in the document data (e.g., "% ps" to denote PostScript). Alternatively, the parsing module may employ a heuristic to determine the document format. Based on the document format identified by the parsing module, the color converter (106) may determine whether the color data of the document is premultiplied (Step 306) because it is known that some formats require the color data to be premultiplied. For example, when the format is XPS or OOXML, the color converter (106) may determine that the color data is premultiplied.

If the color converter (106) determines that the color data is not premultiplied (No at Step 306), the color converter (106) may convert the input document data from the color space (e.g., RGB) to another color space (e.g., CMYK) (Step 314), and write the converted color data to the memory (Step 316).

If the color converter (106) determines that the color data is premultiplied (Yes at Step 306), the color converter (106) may instruct the un-premultiplier (108) to convert the premultiplied color data of the document to un-premultiplied color data (Step 308). The subsequent Steps 310-316 are similar to Steps 208-214 as illustrated above.

In one or more embodiments of the invention, the color conversion module (102) may skip Step 312 and may output the un-premultiplied color data in the second color space to the memory without re-premultiplication.

In one or more embodiments of the invention, the interface (104) may receive format information representing input data format (e.g., PCL, XL, PostScript, PPML, PDF, XPS, OOXML, etc.) from the parsing module. The color converter (106) may identify data format of the input document data by reading the format information instead of parsing the document data before color conversion. However, in one or more embodiments, the color converter (106) may parse the document data and identify its format without relying on a separate parsing module.

Figure 4:
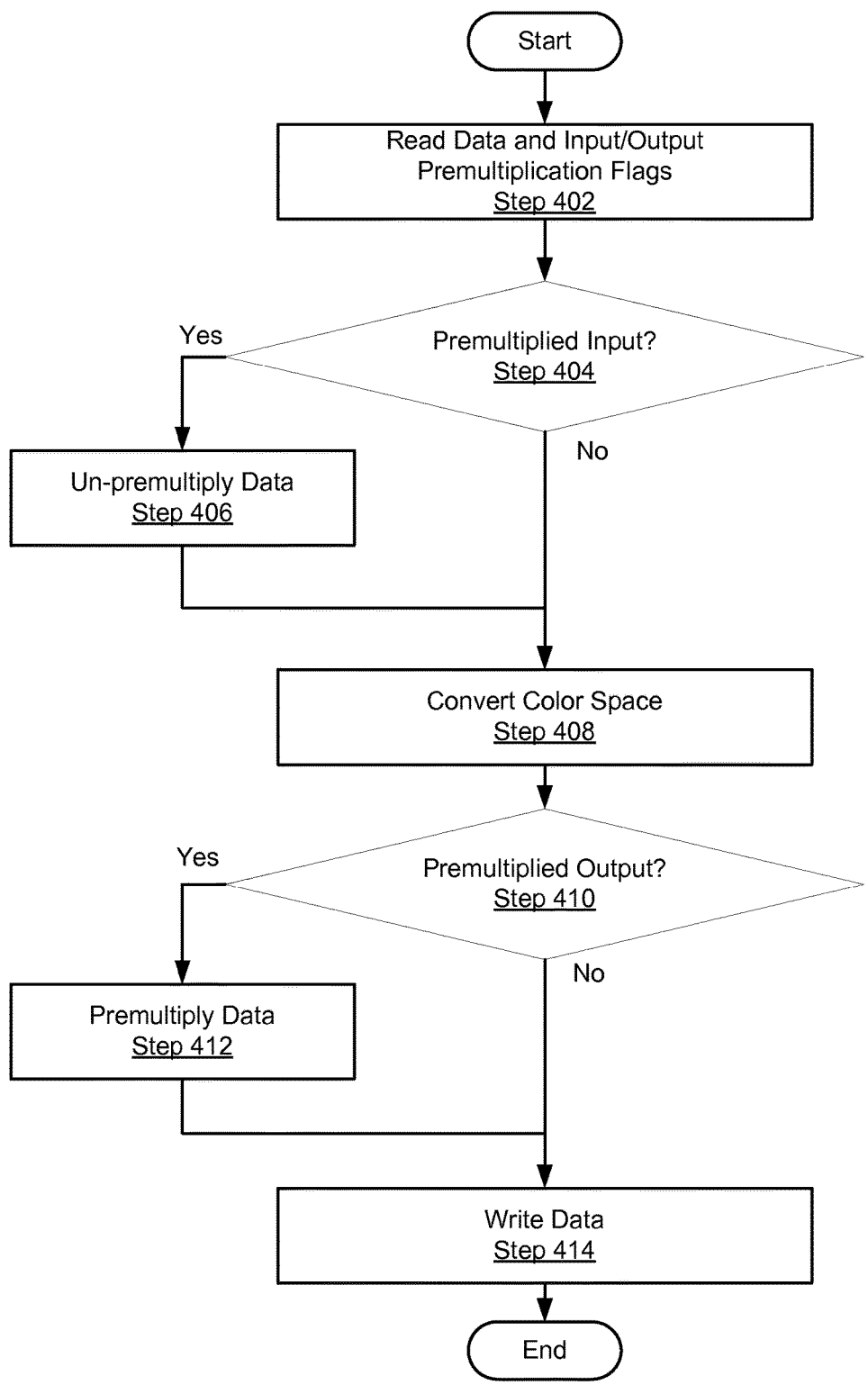

FIG. 4 shows a flowchart in accordance with one or more embodiments of the invention. The process depicted in FIG. 4 may be used to execute color conversion and output either premultiplied or un-premultiplied color data depending on additional information given by an external system or application. One or more of the steps in FIG. 4 may be performed by the components of the system (100), discussed above with reference to FIG. 1. In one or more embodiments of the invention, one or more of the steps shown in FIG. 4 may be omitted, repeated, and/or performed in a different order than the order shown in FIG. 4. Accordingly, the scope of the invention is not limited to the specific arrangement of steps shown in FIG. 4.

Initially, the interface (104) may read input color data represented in a color space and additional information including: (1) a first flag representing whether the input color data is premultiplied; and (2) a second flag representing whether output data should be premultiplied (Step 402). The input color data read from the memory may be stored in the data cache (112). Next, the color converter (106) may determine whether the input color data is premultiplied based on the received first flag (Step 404).

If the color converter (106) determines that the input color data is premultiplied (Yes at Step 404), the color converter (106) may instruct the un-premultiplier (108) to convert the premultiplied input color data to un-premultiplied color data (Step 406). Next, the color converter (106) may convert the input color data from the color space (e.g., RGB) to another color space (e.g., CMYK) (Step 408).

On the other hand, if the color converter (106) determines that the input color data is not premultiplied (No at Step 404), the color converter (106) may convert the input color data from the color space (e.g., RGB) to another color space (e.g., CMYK) (Step 408).

Next, the color converter (106) may determine whether the output color data should be premultiplied based on the received second flag (Step 410). If the color converter (106) determines that the output color data should be premultiplied (Yes at Step 410), the color converter (106) may instruct the premultiplier (110) to convert the color-converted color data to premultiplied color data (Step 412). After the premultiplication, the interface (104) may write the premultiplied color data to the memory (Step 414).

On the other hand, if the color converter (106) determines that the output color data should not be premultiplied (No at Step 410), the interface (104) may write the color-converted color data to the memory without premultiplication (Step 414).

According to one or more embodiments of the invention, the system (100) may handle both premultiplied and un-premultiplied color data directly, thereby reducing memory access required by a program other than the color conversion module. This results in more efficient throughput, particularly when the number of pixels to be converted is large.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output devices to perform one or more embodiments of the invention.

Figure 7:
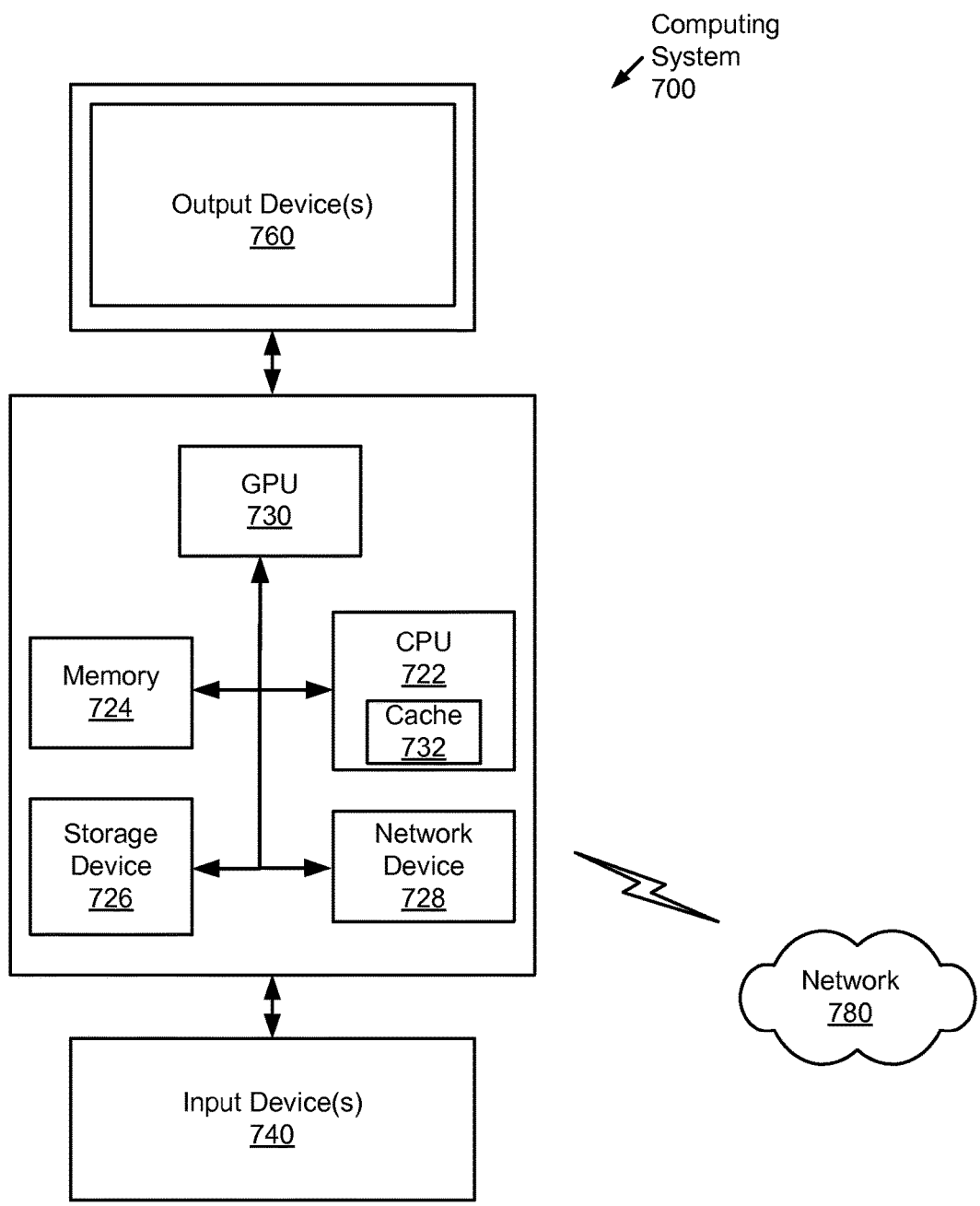
FIG. 7 shows a computer system in accordance with one or more embodiments of the invention.

For example, as shown in FIG. 7, the computing system (700) may include one or more CPUs (722) each having one or more caches (732), associated memory (724) (e.g., random access memory (RAM), cache memory, flash memory, etc.), one or more storage devices (726) (e.g., a hard disk, an optical drive such as a compact disk (CD) drive or digital versatile disk (DVD) drive, a flash memory stick, etc.), a network device (728) (e.g., a network interface card, a wireless LAN module, a wide area network module, a Bluetooth module, a ZigBee module, an infra-red communication module, etc.), one or more GPUs (730), and numerous other elements and functionalities.

The CPU (722) may be an integrated circuit for processing instructions. For example, the computer processor may be one or more cores, or micro-cores of a processor. The CPU (722) may have one or more caches (732) which are faster memories than the (main) memory (724). The computing system (700) may also include one or more input devices (740), such as a touchscreen, keyboard, mouse, microphone, touchpad, electronic pen, or any other type of input device. Further, the computing system (700) may include one or more output devices (760), such as a screen (e.g., a liquid crystal display (LCD), plasma display, touchscreen, cathode ray tube (CRT) monitor, projector, or other display device), a printer or a plotter, external storage, or any other output device. One or more of the output devices may be the same or different from the input devices. The computing system (700) may be connected to a network (780) (e.g., a local area network (LAN), a wide area network (WAN) such as the Internet, mobile network, or any other type of network) via a network interface connection (not shown). The input and output devices may be locally or remotely (e.g., via the network (780)) connected to the CPU (722), memory (724), storage device (726), network device (728), and GPU (730). Many different types of computing systems exist, and the aforementioned input and output devices may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor, is configured to perform embodiments of the invention.

Further, one or more elements of the aforementioned computing system (700) may be located at a remote location and connected to the other elements over a network (780). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing pixels, comprising:
   reading from a memory color data of the pixels represented in a first color space supported by a first device;
   converting the color data into un-premultiplied color data;
   converting the un-premultiplied color data from the first color space to a second color space supported by a second device;
   converting the un-premultiplied color data in the second color space into first premultiplied color data;
   setting the pixels to the first premultiplied color data; and
   outputting the pixels using the second device, wherein the second device is at least one selected from a group consisting of a printer and a display device.

2. The method of claim 1, wherein the converting of the color data into the un-premultiplied color data, the converting of the un-premultiplied color data to the second color space, and the converting of the un-premultiplied color data into the first premultiplied color data each further comprises storing the color data on a cache.

3. The method of claim 1, further comprising:
   reading from the memory another color data represented in a first color space;
   determining whether the another color data is premultiplied; and
   when the determining determines that the another color data is not premultiplied:
   converting the another color data from the first color space to the second color space, and
   writing the another color data converted to the second color space to the memory.

4. The method of claim 3, further comprising:
   receiving additional information relating to the another color data,
   wherein the determining is based on the additional information.

5. The method of claim 4, wherein the additional information comprises a first flag representing whether the another color data is premultiplied or conversion information representing the first color space and the second color space.

6. The method of claim 4, wherein the additional information comprises format information representing a format of the document data, and the determining comprises, when the document format is either XPS or OOXML, determining that the another color data is premultiplied.

7. The method of claim 4, wherein the additional information comprises a second flag representing whether the another color data converted to the second color space to be written to the memory is premultiplied, and when the second flag represents that the another color data to be written is premultiplied, the writing of the another color data converted to the second color space to the memory further comprises:
   converting the another color data in the second color space into second premultiplied color data; and
   writing the second premultiplied color data to the memory.

8. The method of claim 7, wherein when the second flag represents that the another color data to be written is not premultiplied, the method further comprises writing the un-premultiplied color data in the second color space to the memory.

9. The method of claim 1, wherein the color data is represented by red, green, blue, and alpha components, and the converting of the color data into the un-premultiplied color data further comprises:
   multiplying each of the red, green, and blue components by a maximum value for representing each component; and
   dividing each of the multiplied red, green, and blue components by the alpha component.

10. The method of claim 9, wherein the converting of the un-premultiplied color data in the second color space into the first premultiplied color data further comprises:
    multiplying each of the red, green, and blue components of the un-premultiplied color data by the alpha component; and
    dividing each of the red, green, and blue components multiplied by the alpha component, by the maximum value.

11. A color conversion system for processing pixels, comprising:
    a memory that stores color data of the pixels represented in a first color space supported by a first device; and
    a processor that:
    reads from the memory the color data,
    converts the color data into un-premultiplied color data,
    converts the un-premultiplied color data from the first color space to a second color space supported by a second device,
    converts the un-premultiplied color data in the second color space into first premultiplied color data,
    sets the pixels to the first premultiplied color data, and
    outputs the pixels using the second device, wherein the second device is at least one selected from a group consisting of a printer and a display device.

12. The color conversion system of claim 11, wherein the processor converts the color data into the un-premultiplied color data, the un-premultiplied color data to the second color space, and the un-premultiplied color data into the first premultiplied color data, with a cache of the processor.

13. The color conversion system of claim 11, wherein the processor:
    reads from the memory another color data represented in a first color space;
    determines whether the another color data is premultiplied, and
    when the processor determines that the another color data is not premultiplied:
    converts the another color data from the first color space to a second color space, and
    writes the another color data converted to the second color space to the memory.

14. The color conversion system of claim 13, wherein the processor:
    receives additional information relating to the another color data, and
    determines whether the another color data is premultiplied based on the additional information.

15. The color conversion system of claim 14, wherein the additional information comprises a first flag representing whether the another color data is premultiplied or conversion information representing the first color space and the second color space.

16. The color conversion system of claim 14, wherein the additional information comprises format information representing a format of the document data, and when the document format is either XPS or OOXML, the processor determines that the another color data is premultiplied.

17. The color conversion system of claim 14, wherein the additional information comprises a second flag representing whether the another color data converted to the second color space to be written to the memory is premultiplied, and when the second flag represents that the another color data to be written is premultiplied, the processor:
    converts the another color data converted to the second color space into second premultiplied color data; and
    writes the second premultiplied color data to the memory.

18. The color conversion system of claim 17, wherein when the second flag represents that the another color data to be written is not premultiplied, the processor writes the un-premultiplied color data in the second color space to the memory.

19. The color conversion system of claim 11, wherein the color data is represented by red, green, blue, and alpha components, and the converting of the color data into the un-premultiplied color data further comprises that the processor:
    multiplies each of the red, green, and blue components by a maximum value for representing each component,
    divides each of the multiplied red, green, and blue components by the alpha component, and
    converts the divided red, green, and blue components from the first color space to the second color space.

20. The color conversion system of claim 19, wherein the converting of the un-premultiplied color data in the second color space into the first premultiplied color data further comprises that the processor:
    multiplies each of the converted red, green, and blue components by the alpha component of the color data,
    divides each of the red, green, and blue components multiplied by the alpha component, by the maximum value, and
    writes to the memory the divided red, green, and blue components and the alpha component as the first premultiplied color data.

* * * * *